INVENTOR:
Rolf Möhring

INVENTOR:
*Rolf Möhring*

United States Patent Office 3,078,371
Patented Feb. 19, 1963

3,078,371
PULSE DENSITY MEASURING DEVICE
Rolf Möhring, Dresden, Germany, assignor to
VEB Vakutronik, Dresden, Germany
Filed Apr. 27, 1960, Ser. No. 25,029
4 Claims. (Cl. 250—83.6)

This invention relates to pulse density measuring devices. More particularly, the invention relates to such devices employing transistorized monostable multivibrator circuits for pulse density measuring purposes.

Such devices have—particularly if germanium junction transistors are used—the disadvantage that the width of pulses to be measured depends on temperature conditions. This is due to the fact that the collector current and consequently also the current through the base of a germanium transistor depends on temperature conditions in accordance with its temperature coefficient. As a result such devices generally do not measure the charge of a pulse but differentiate the amplitude of the pulse and indicate only this differentiated portion of the pulse. This is disadvantageous, particularly in devices having several measuring ranges.

It is, therefore, one of the major objects of this invention to operate an impulse density measuring device independently of temperature conditions.

It is a further object of the present invention to achieve elimination of temperature dependency of such devices in a very economical manner.

It is also an object of this invention to provide a pulse density measuring device suitable for use in connection with pulse counters such as "Geiger-Mueller" counters.

In one aspect of the invention, the above objects are achieved by measuring the charge or discharge of a time constant determining capacitor in a monostable multivibrator circuit as the value representing the pulse density.

The invention, its objects and advantages will be more clearly understood in connection with the following specification of the accompanying drawings, in which.

Figure 1:
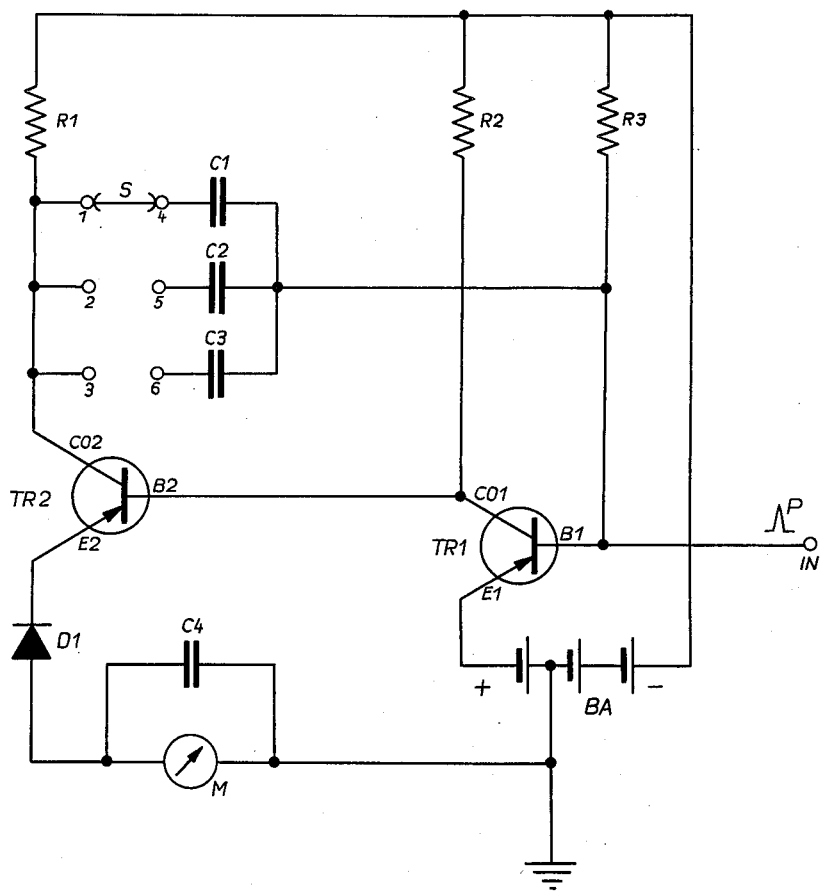
FIGS. 1 and 2 show known pulse density devices each employing a transistorized monostable multivibrator.

In FIG. 1 there is shown a known monostable multivibrator having two junction transistors TR1 and TR2. Base B2 of transistor TR2 is connected to collector CO1 of transistor TR1. Collector CO1 and base B2 are also connected through resistor R2 to the negative pole of battery BA. Collector CO2 of transistor TR2 is connected through resistor R1 to the same negative pole of battery BA. Base B1 of transistor TR1 is also connected to battery BA through resistor R3. Base B1 and collector CO2 are connected with each other through one of condensers C1, C2, C3, switchable into the circuit by means of selector S which connects terminal 1 with terminal 4 or in a second position, terminal 2 with terminal 5 or 3 with 6, thereby selecting for each connection a different condenser C1, C2 or C3. Emitter E2 of transistor TR2 is connected through diode D1 and through an indicator means such as a D.-C. ammeter M to ground. Emitter E1 of transistor TR1 is connected to the positive pole of battery BA, a tap of which is connected to ground. In parallel to meter M is connected condenser C4 which stores and smoothes the charging and discharging currents which occur in the form of pulses.

The circuit shown in FIG. 1 operates in a known manner as follows: as long as a sufficient current flows through resistors R3 into base B1 of transistor TR1 this transistor remains in its conducting state and consequently transistor TR2 is kept in its non-conducting state. If a positive pulse P appears at input terminal IN, that is at base B1, transistor TR1 becomes non-conductive and transistor TR2 starts conducting. At the same time, one of the capacitors C1, C2 or C3, whichever is in the circuit, discharges through resistor R3 thereby keeping base B1 of transistor TR1 at positive potential for a period determined by the time constant of C1, C2, or C3 times R3. During this time a current flows through conducting transistor TR2, through diode D1 and through meter M which indicates the pulse charge. Diode D1, which for instance may be a silicon or selenium diode, limits the inverse current through emitter E2 of transistor TR2.

It is a drawback of the circuit described above that the condenser C1, C2, or C3, not only discharges through resistor R3 but also through base B1 of transistor TR1. This discharge current consequently depends to a large extent on temperature conditions, particularly if germanium transistors are used. As a result, the pulse widths and the pulse magnitude indicated by meter M are also influenced strongly by temperature changes. A further measuring error is due to the temperature coefficient of transistor TR2.

Figure 2:
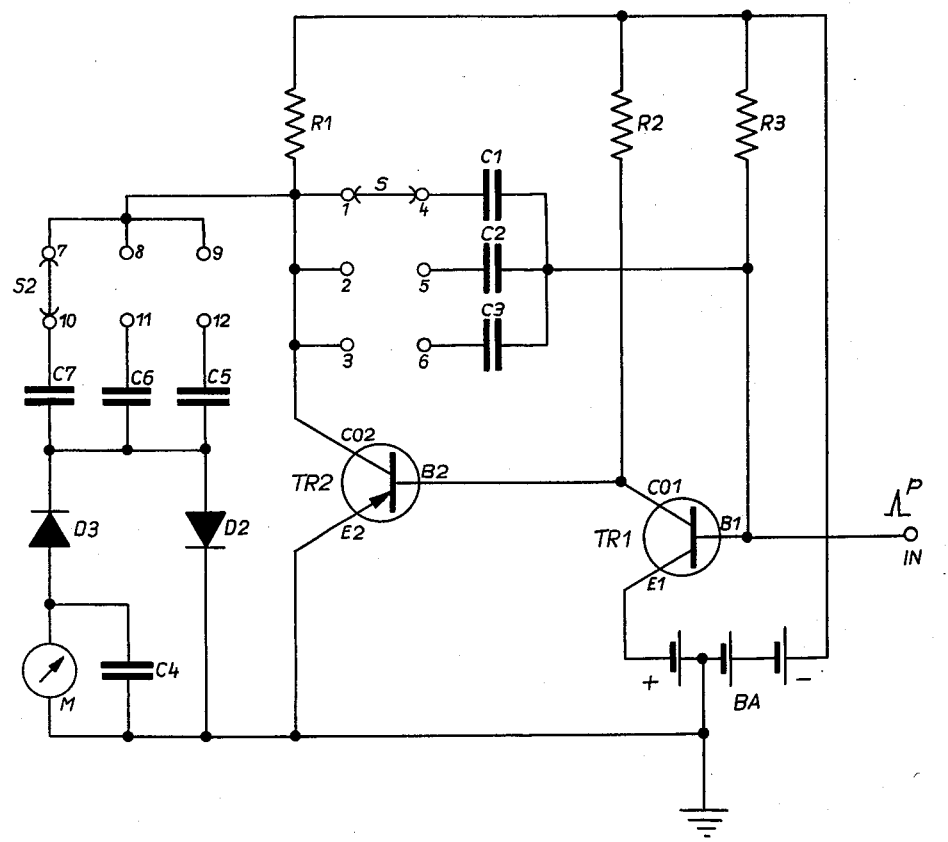

FIG. 2 illustrates a known circuit similar to that shown in FIG. 1. It employs also a monostable transistorized multivibrator with the same parts as shown in FIG. 1 except that additional means are provided for eliminating the influence of temperature changes. Instead of connecting the meter M between the emitter circuit of transistor TR2 and ground as shown in FIG. 1, the meter M in FIG. 2 is connected in a circuit comprising the following parts. Terminals 7, 8, 9 connected to collector CO2 of transistor TR2 are connectable to further terminals 10, 11, and 12 by means of an additional selector S2 thereby connecting one of the additional condensers C5, C6, or C7 to reversely polarized diodes D2 and D3. Meter M is now connected between diode D3 and emitter E2 and, together with emitter E2, to ground. Diode D2 is directly connected to emitter E2 and to ground.

In the circuit shown in FIG. 2 temperature influences due to the temperature coefficient of transistor TR1 are eliminated by indicating only the voltage change across transistor TR2. This voltage change across TR2 is to a large extent independent of temperature changes. Consequently, the indication also is independent of such changes.

A disadvantage of this known circuit is, however, the relatively large number of parts required. This disadvantage is eliminated according to the invention in a circuit as shown in FIG. 3 in which the meter M measures directly the charging or discharging current of the time constant condensers C1, C2, or C3 whichever is connected into the circuit by means of selector S.

In the circuit according to the invention, the quantity of electricity, which charges one of the condensers C1, C2, or C3 or which is discharged from one of said condensers and which is equal to $Q = C \cdot V$ (capacity times voltage), depends only on the voltage change and on the capacity of condensers C1, C2, or C3.

Figure 3:
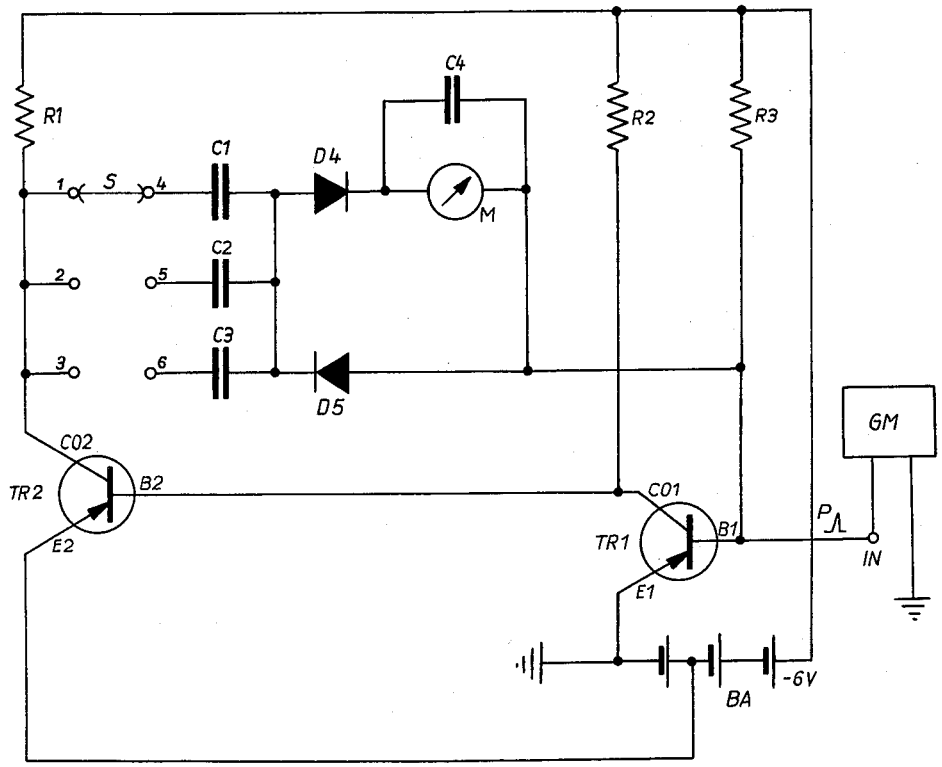
FIG. 3 illustrates a device in which temperature influence is eliminated according to this invention.

FIG. 3 shows the details of a circuit according to the invention, said circuit being suitable for use in a pulse density measuring device preferably in connection with a portable pulse counter device such as Geiger-Mueller counter GM, the output of which is connected to the input IN of the monostable multivibrator.

The meter M is connected according to the invention between diode D4 and base B1. Diode D4 connects the meter M to condensers C1, C2, C3. Diode D5, reversely polarized to diode D4, connects said condensers to base B1. The monostable multivibrator function of the circuit according to the invention is the same as that of the circuit shown in FIG. 1 and described above. Further description therefore is unnecessary.

In one embodiment of the invention the following dimensions were employed:

Resistor $R1=2.5K$, $R2=2.5K$, $R3=20K$, $C1=50 \cdot 10^{-9}$ f., $C2=.5 \cdot 10^{-9}$ f., and $C3=5 \cdot 10^{-9}$ f.

Preferably silicon or selenium diodes were used. In a test with this embodiment of the invention the temperature error between 0° C. and 45° C. was smaller than ±2.5% even though a plurality of transistors and diodes were tested.

It is, of course, to be understood that the present invention is by no means limited to the particular dimensions given above or to the particular arrangements shown in the drawings but also comprises any modifications within the scope of the appended claims.

What I claim is:

1. A pulse density measuring device comprising a monostable multivibrator having two transistors, time constant determining condensers, means for selectively switching one of said condensers into the multivibrator circuit, reversely polarized diodes, and measuring means, said one condenser having one terminal connected through said selective switching means to the collector electrode of one of said transistors and having the other terminal connected to said diodes, one of said diodes being connected directly between said condensers and the base of the second transistor, the other diode being connected through said measuring means to said base electrode of said second transistor, whereby the quantity of electricity discharged by said one condenser is measured by said measuring means as an indication for the pulse density.

2. A pulse density measuring device comprising a monostable multivibrator having two transistors, time constant determining condensers, means for selectively switching one of said condensers into the multivibrator circuit, a pair of reversely poled diodes, and measuring means, said one condenser having one terminal connected by said selective switching means to the collector electrode of one of said transistors and having the other terminal connected to said diodes, one of said diodes being connected directly between said condensers and the base of the second transistor, the other diode connecting said condensers through said measuring means to said base electrode of said second transistor, whereby the quantity of electricity charging said one condenser is measured by said measuring means as an indication of the pulse density.

3. A pulse density measuring device comprising a monostable multivibrator with two transistors, time constant determining condensers, means for selectively switching said condenser into the multivibrator circuit, a pair of oppositely poled diodes, and measuring means, said selective switching means connecting one terminal of one of said condensers to the collector electrode of one of said transistors, the other terminal of said one condenser being connected to said diodes, one of said diodes connecting said one condenser to the base of the second transistor while the other diode connects the same condenser through said measuring means to the base electrode of said second transistor, means for impressing the pulses to be measured on said multivibrator whereby the quantity of electricity discharge by said one condenser is measured by said measuring means as an indication of the density of pulses impressed on the multivibrator.

4. A pulse density measuring device according to claim 2 in which the input of said monostable multivibrator is connected to the output of a Geiger-Mueller counter.

References Cited in the file of this patent

UNITED STATES PATENTS

| | | |
|---|---|---|
| 2,802,071 | Lin | Aug. 6, 1957 |
| 2,920,208 | Crump | Jan. 5, 1960 |

OTHER REFERENCES

Transistorized Radiation Survey Instruments by Spear, Nucleonics, vol. 15, No. 6, June 1957, pages 100 to 104.